US008829089B1

(12) United States Patent
Wu

(10) Patent No.: US 8,829,089 B1
(45) **Date of Patent: *Sep. 9, 2014**

(54) FUSER MEMBER COMPOSITIONS

(71) Applicant: Xerox Corporation, Norwalk, CT (US)

(72) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/954,934

(22) Filed: Jul. 30, 2013

(51) Int. Cl.
*C08K 5/521* (2006.01)
*G03G 15/20* (2006.01)

(52) U.S. Cl.
CPC .................................. *G03G 15/2053* (2013.01)
USPC .......................................................... 524/140

(58) Field of Classification Search
USPC .......................................................... 524/140
See application file for complete search history.

(56) References Cited

U.S. PATENT DOCUMENTS

| | | | | |
|---|---|---|---|---|
| 3,364,192 | A * | 1/1968 | Leach | 524/140 |
| 2012/0207999 | A1* | 8/2012 | Ohya et al. | 428/220 |
| 2012/0231258 | A1* | 9/2012 | Wu | 428/323 |

* cited by examiner

*Primary Examiner* — Peter Szekely
(74) *Attorney, Agent, or Firm* — Eugene O. Palazzo

(57) ABSTRACT

A xerographic fuser member that contains a composition comprising a mixture of a polyimide and a neutralized amine alcohol phosphate.

20 Claims, 3 Drawing Sheets

FUSER MEMBER COMPOSITIONS

This disclosure is generally directed to fuser members useful in electrophotographic imaging apparatuses, including digital, image on image, and transfix solid ink jet printing systems, and where the fuser member is comprised of a substrate layer comprising a mixture of a polyimide and a neutralized amine alcohol phosphate.

In the process of xerography, a light image of an original to be copied is typically recorded in the form of a latent electrostatic image upon a photosensitive or a photoconductive member with subsequent rendering of the latent image visible by the application of particulate thermoplastic material, commonly referred to as toner. The visual toner image can be either fixed directly upon the photosensitive member or the photoconductor member, or transferred from the member to another support, such as a sheet of plain paper, with subsequent affixing by, for example, the application of heat and pressure of the image thereto.

To affix or fuse toner material onto a support member like paper, by heat and pressure, it is usually necessary to elevate the temperature of the toner and simultaneously apply pressure sufficient to cause the constituents of the toner to become tacky and coalesce. In both the xerographic as well as the electrographic recording arts, the use of thermal energy for fixing toner images onto a support member is known.

One approach to the heat and pressure fusing of toner images onto a support has been to pass the support with the toner images thereon between a pair of pressure engaged roller members, at least one of which is internally heated. For example, the support may pass between a fuser roller and a pressure roller. During operation of a fusing system of this type, the support member to which the toner images are electrostatically adhered is moved through the nip formed between the rollers with the toner image contacting the fuser roll thereby to effect heating of the toner images within the nip.

Also known are centrifugal molding processes to obtain fuser belts, and where a thin, about 0.5 micron, fluorine containing release layer or a silicone release layer is applied to the inner surface of a rigid cylindrical mandrel, and a polyimide coating is applied to the inner surface of the mandrel containing the release layer, and where the polyimide is cured and then released from the mandrel. There are a number of disadvantages relating to the aforementioned processes, such as that the length of the polyimide belt is determined by the size of the mandrel, and that there is a requirement for a release layer on the inner surface of the mandrel, which can be costly, and which involves an additional process step. Thus, without an added release layer the polyimide usually will not self release without any external efforts.

A number of known fuser members that may contain certain internal release agents can cause the substrate of the members to discolor and corrode thereby reducing the number of times that the fuser member can be used, and requiring replacement thereof at a significant cost.

Also, known are fuser members that contain highly acidic, such as with a pH of about 3, internal release agents, and where this acidity causes degradation of a substrate, such as stainless steel.

There is a need for xerographic fusing members that substantially avoid or minimize the disadvantages of a number of known fusing members.

Also, there is a need for fuser member materials that possess self-release characteristics from a number of substrates that are selected when such members are prepared and where the substrates can be repeatedly used.

There is also a need for economical endless seamless fusing members, that is with an absence of any seams or visible joints in the members, that are selected for the heat fusing of developed images in xerographic processes, and where the members are free of a separate release layer.

Yet another need resides in providing seamless fusing members and seamless fusing belts that can be generated at a cost lower than those fuser members that contain a separate release layer, and at a lower cost than known centrifugal generated seamless polyimide belt processes.

Further, there is a need for xerographic fuser members that contain non-fluoro internal release agents of neutralized amine alcohol phosphates, and which phosphates permit the rapid release of a polymer, such as polyimide, containing composition from a substrate in an economical manner, and where the adhesion of an overcoating layer, such as a polymer like a silicone layer, is substantially permanent.

Additionally, there is a need for fusing members and seamless belts thereof that contain compositions that can be economically and efficiently manufactured, and where costly preparation substrates, such as diamond like carbon-coated metal substrates can be avoided for the generation and release of certain polymers like a polyimide containing coating film.

Also, there is a need for fusing members with a combination of excellent mechanical properties thereby extending the life time thereof, and with stable substantially consistent characteristics as illustrated herein, and where only a single coating layer is needed.

There is additionally a need for fuser members that are environmentally acceptable, where the number of preparation coating steps can be reduced, where economical stainless steel substrates can be utilized for the preparation of the fuser members, where there may be selected reduced amounts of solvents for the preparation of the fuser member materials, and where the substrate, such as stainless steel, can be used for extended time periods while retaining its excellent release characteristics.

These and other needs are achievable in embodiments with the fuser members and components thereof disclosed herein.

SUMMARY

Disclosed is a fuser member comprising a substrate layer comprising a mixture of a polyimide and a neutralized amine alcohol phosphate.

Also disclosed is a xerographic fuser belt comprising an optional supporting substrate, and a composition comprising a mixture of a polyimide and a neutralized amine alcohol phosphate of the following formula/structure

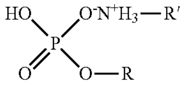

wherein R and R' are each independently an alkyl group or an alkenyl group, and wherein the neutralized amine alcohol phosphate has a pH of from about 4 to about 6.5.

Further disclosed is a xerographic fuser member comprising a mixture of a polyimide and a neutralized amine alcohol phosphate with a pH of from about 4 to about 6.5, and of the following formula/structure

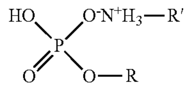

wherein R and R' are each independently an alkyl group with from about 1 to about 25 carbon atoms, and which member possesses a Young's Modulus of from about 5,000 to about 10,000 MPa.

FIGURES

The following Figures are provided to further illustrate the fuser members disclosed herein.

EMBODIMENTS

The disclosed fuser member comprises a mixture of a polymer, such as a polyimide polymer, and a neutralized amine alcohol phosphate.

In various embodiments, the fuser member can include, for example, a substrate layer comprising a mixture of a polyimide polymer and a neutralized amine alcohol phosphate with one or more optional functional layers formed thereon. The substrate can be formed in various shapes, such as a belt, or a film using suitable materials that are non-conductive or conductive, with the thickness of the fuser member being, for example, from about 30 to about 1,000 microns, from about 100 to about 800 microns, from about 150 to about 500 microns, from about 100 to about 125 microns, or from about 60 to about 80 microns.

The arrows when present in each of the following Figures illustrate the direction of movement of the various components shown.

Figure 1:
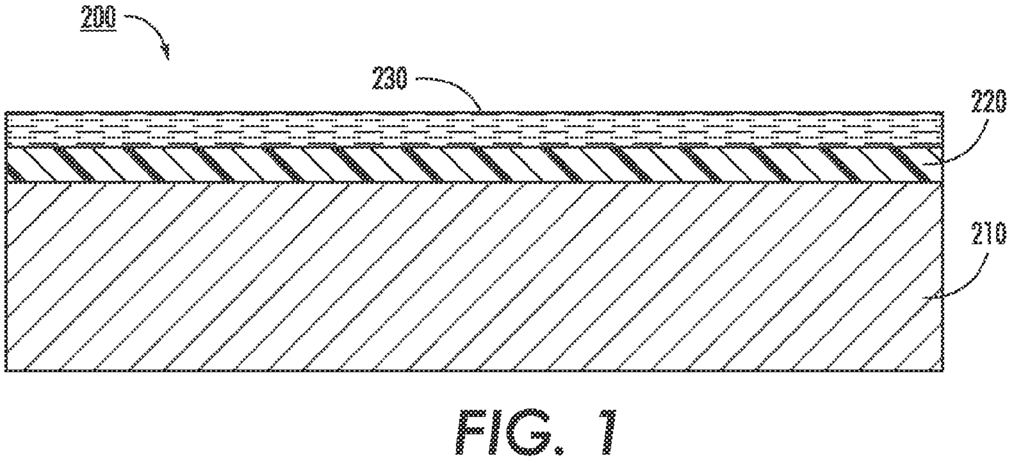
FIG. 1 illustrates an exemplary embodiment of a cross-sectional view of a fuser member in the form of a belt of the present disclosure.

In FIG. 1 an exemplary embodiment of the present disclosure, a fuser or transfix member 200, can include a substrate or belt 210 comprised of a mixture of a polyimide polymer and a neutralized amine alcohol phosphate with one or more, such as from 1 to about 4, or from 1 to about 2, functional intermediate layer 220, and an optional outer surface release layer 230 formed thereon.

Figure 2A:
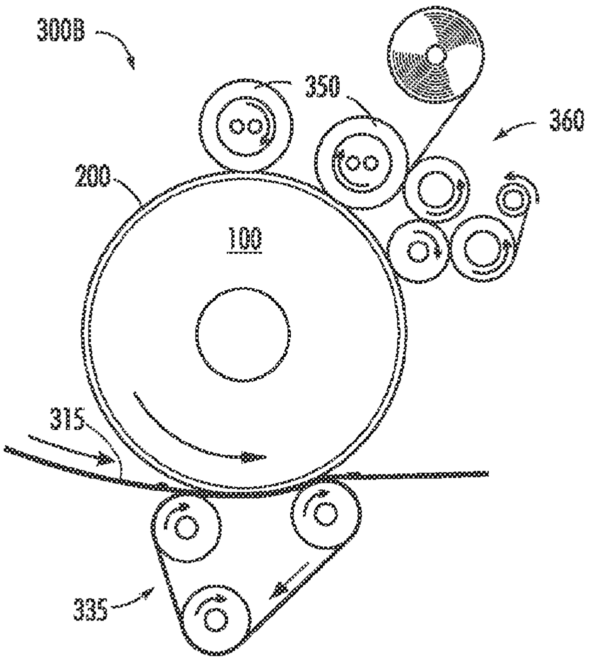
FIGS. 2A and 2B illustrate exemplary generalized fusing configurations of the present disclosure.
Figure 2B:
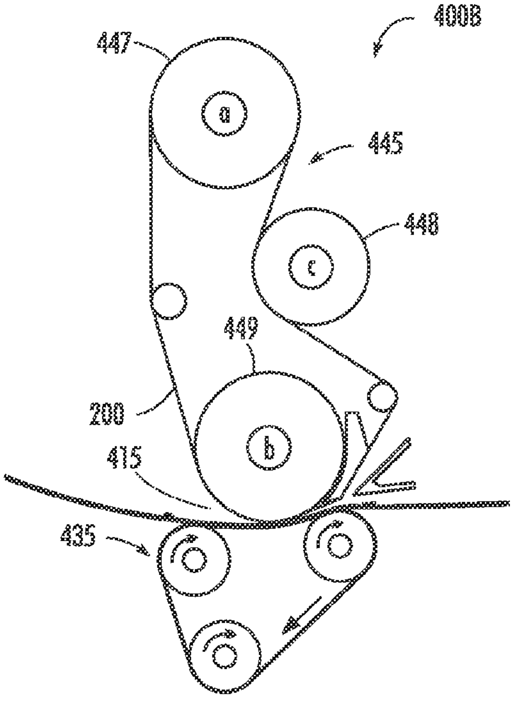

FIGS. 2A and 2B illustrate exemplary generalized fusing configurations selected for fusing processes in accordance with the present disclosure, noting that although an electrophotographic printer is described herein, the disclosed apparatus and method can be applied to other printing technologies, examples of which include offset printing, and inkjet and solid ink jet transfix machines, and for oilless fusing systems.

FIG. 2A illustrates a fusing configuration 300B incorporating the fuser member 200 shown, for example, in FIG. 1. The configuration 300B can include the fuser belt of FIG. 1, circumferentially wrapped around a drum 100, that forms a fuser nip with a pressure applying mechanism 335, which includes a pressure belt for an image supporting material 315. In various embodiments, the pressure applying mechanism 335, can be used in combination with a heat lamp (not shown) to provide both the pressure and heat for the fusing or fixing of the toner particles on the image supporting material 315. In addition, the configuration 300B can include one or more external heat rolls 350, together with a cleaning web 360, as shown in FIG. 2A.

FIG. 2B illustrates the fusing configuration 400B with the fuser member shown in FIG. 1. The configuration 400B can include the fuser member in the form of a belt 200, of FIG. 1, that forms a fuser nip with a pressure applying mechanism 435, such as a pressure belt, with rollers for a media or paper substrate 415. In various embodiments, the pressure applying mechanism 435 can be used in a combination with a heat lamp (not shown) to provide both the pressure and heat for the fusing of the toner particles on the media substrate, such as paper 415. In addition, the configuration 400B can include a mechanical system 445, which can also be used as heat rollers or a heat roller when needed, and with at least one roller, such as rollers a, b, and c, designated by 447, 448, and 449, at least one of which is caused by a motor (not shown) to rotate in a known manner, to move the fuser belt 200, and to fuse the toner particles to form developed images on the media substrate, such as paper.

Figure 3:
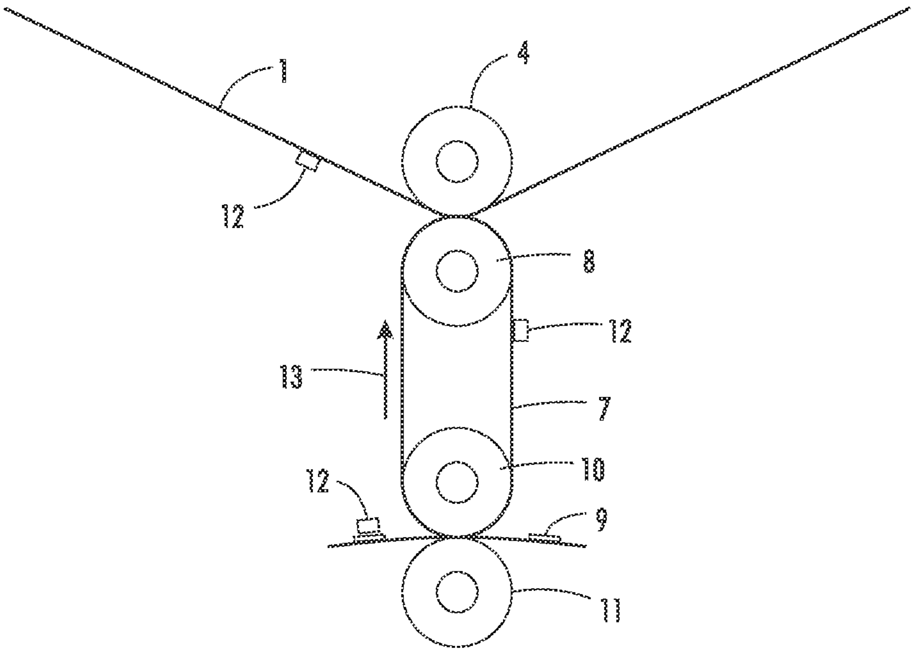
FIG. 3 illustrates an exemplary embodiment of a transfix apparatus of the present disclosure.

FIG. 3 demonstrates a view of an embodiment of a transfix member 7, which may be in the form of a belt, sheet, film, or like form. The transfix member 7 is constructed similarly to the fuser member 200 of FIG. 1, or belt 200 of FIG. 2B illustrated herein. The xerographic toner developed image 12, positioned on fusing member 1, is brought into contact with and transferred to transfix member 7, via rollers 4 and 8. Roller 4 and/or roller 8 may or may not have heat associated therewith. Transfix member 7 proceeds in the direction of arrow 13. The developed image 12 is transferred by transfix member 7, and fused to a copy substrate 9, as the copy substrate 9 is advanced between rollers 10 and 11, to result in the final fused toner developed image 12. Rollers 10 and/or 11 may or may not have heat associated therewith.

Figure 4:
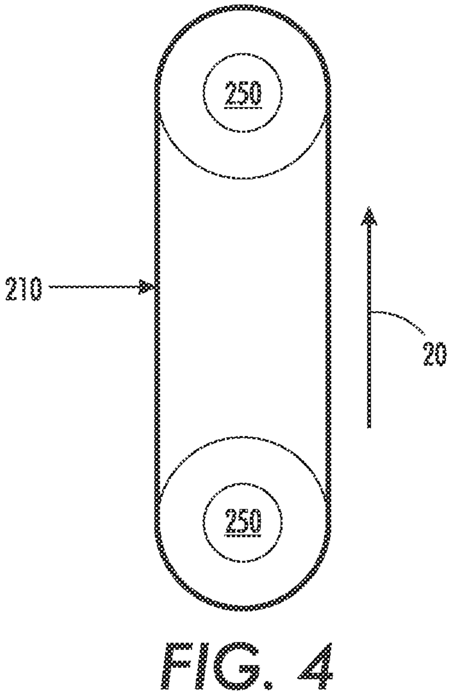
FIG. 4 illustrates an exemplary embodiment of a tensioning device to, for example, accomplish the final curing of the fuser member coating composition.

FIG. 4 illustrates a curing device for the fuser member of the present disclosure. The curing of the disclosed fuser member coatings is, for example, accomplished at a tension of from about 1 to about 10 kilograms or from about 3 to about 7 kilograms, and where the pre-cured member or belt 210 is tensioned between two rollers 250, while rotating in the direction of arrow 20. The first, or pre-curing of the disclosed coating composition mixture can be accomplished at various suitable temperatures of, for example, from about 150° C. to about 250° C., from about 125° C. to about 250° C., or from about 180° C. to about 220° C. for a suitable period of time of, for example, from about 30 to about 90 minutes, or from about 45 to about 75 minutes, followed by a final curing at a temperature of, for example, from about 250° C. to about 370° C., or from about 300° C. to about 325° C. for a suitable period of time of, for example, from about 15 minutes to about 75 minutes, from about 20 minutes to about 60 minutes, or from about 30 to about 50 minutes.

The resulting cured polyimide neutralized amine alcohol phosphate composition mixture self-releases from a number of substrates, such as a welded or seamless stainless steel belt or drum, a diamond like carbon-coated metal substrate, a seamless aluminum belt or drum, an electroformed seamless nickel belt or drum, or a glass drum. Self-release characteristics without the assistance of any external sources, such as prying devices, permits the efficient, economical formation, and full separation, from about 90 to about 100 percent, or from about 95 to about 99 percent of the disclosed fuser coating polymer and neutralized amine alcohol phosphate compositions from metal substrates, and where release materials and separate release layers can be avoided. The time period to obtain the self-release characteristics of the disclosed fuser member composition varies depending, for example, on the components present, and the amounts thereof selected. Generally, however, the release time period is from about 1 to about 65 seconds, from about 1 to about 50 seconds, from about 1 to about 35 seconds, from about 1 to about 20 seconds, or from about 1 to about 5 seconds, and in some instances less than 1 second.

The disclosed fuser member composition mixtures of the polyimide and the neutralized amine alcohol phosphate can be flow coated on a welded or seamless stainless steel belt or drum, a seamless aluminum belt or drum, an electroformed seamless nickel belt or drum, a diamond like carbon-coated metal substrate, or a glass drum at the desired product circumferences.

There is also disclosed herein a method of forming a fuser belt suitable for use in a xerographic system. The method comprises, for example, the flow coating of a composition comprising a polyimide, a neutralized amine alcohol phosphate and a solvent onto the outer surface of a rotating substrate, such as a welded or seamless stainless steel belt or drum, or a seamless aluminum belt or drum, or an electroformed seamless nickel belt or drum, or a glass drum at the desired product circumferences. The coating is partially cured and then subsequently cured as illustrated herein on the rotating substrate.

Fuser Member Compositions

The disclosed fuser member can comprise an optional supporting substrate and a composition comprising a mixture of a polymer, such as polyimide and a neutralized amine alcohol phosphate, which composition self releases from a metal substrate, such as stainless steel, and where an external release layer on the metal substrate can be avoided. Thus, the disclosed composition is cost effective since, for example, only one coating layer is needed and degradation of the substrate can be avoided or minimized for extended time periods.

In embodiments, the disclosed fuser substrate layer composition comprises a polyimide precursor, such as a polyamic acid, and in particular a polyamic acid of biphenyl tetracarboxylic dianhydride/phenylenediamine, or a polyamic acid of biphenyl tetracarboxylic dianhydride/4,4'-diaminobenzene, and primarily functioning as an internal release agent, a neutralized amine alcohol phosphate.

Polyimides

Examples of polyimides selected for the fuser member mixtures illustrated herein can be formed from a polyimide precursor of a polyamic acid that includes one of a polyamic acid of pyromellitic dianhydride/4,4'-oxydianiline, a polyamic acid of pyromellitic dianhydride/phenylenediamine, a polyamic acid of biphenyl tetracarboxylic dianhydride/4,4'-oxydianiline, a polyamic acid of biphenyl tetracarboxylic dianhydride/4,4'-diaminobenzene, a polyamic acid of biphenyl tetracarboxylic dianhydride/phenylenediamine, a polyamic acid of benzophenone tetracarboxylic dianhydride/4,4'-oxydianiline, a polyamic acid of benzophenone tetracarboxylic dianhydride/4,4'-oxydianiline/phenylenediamine, and the like, and mixtures thereof. After curing, the resulting polyimides include a polyimide of pyromellitic dianhydride/4,4'-oxydianiline, a polyimide of pyromellitic dianhydride/phenylenediamine, a polyimide of biphenyl tetracarboxylic dianhydride/4,4'-oxydianiline, a polyimide of biphenyl tetracarboxylic dianhydride/phenylenediamine, a polyimide of benzophenone tetracarboxylic dianhydride/4,4'-oxydianiline, a polyimide of benzophenone tetracarboxylic dianhydride/4,4'-oxydianiline/phenylenediamine, and mixtures thereof.

For the generation of the polyimides selected for the fuser members illustrated herein, there can be utilized polyamic acids of biphenyl tetracarboxylic dianhydride/phenylenediamine including U-VARNISH A, and S (about 20 weight percent in NMP), both available from UBE America Inc., New York, N.Y., or available from Kaneka Corp., TX.; PI-2610 (about 10.5 weight percent in NMP), and PI-2611 (about 13.5 weight percent in NMP), both available from HD MicroSystems, Parlin, N.J.

Commercially available examples of polyamic acids of benzophenone tetracarboxylic dianhydride/4,4'-oxydianiline include RP46 and RP50 (about 18 weight percent in NMP), both available from Unitech Corp., Hampton, Va.; while commercially available examples of polyamic acids of benzophenone tetracarboxylic dianhydride/4,4'-oxydianiline/phenylenediamine include PI-2525 (about 25 weight percent in NMP), PI-2574 (about 25 weight percent in NMP), PI-2555 (about 19 weight percent in NMP/aromatic hydrocarbon=80/20), and PI-2556 (about 15 weight percent in NMP/aromatic hydrocarbon/propylene glycol methyl ether=70/15/15), all available from HD MicroSystems, Parlin, N.J.

Commercially available examples of polyamic acid of pyromellitic dianhydride/4,4'-oxydianiline selected for the formation of a polyimide, include PYRE-ML RC5019 (about 15 to 16 weight percent in N-ethyl-2-pyrrolidone, NMP), RC5057 (about 14.5 to 15.5 weight percent in NMP/aromatic hydrocarbon=80/20), and RC5083 (about 18 to 19 weight percent in NMP/DMAc=15/85), all available from Industrial Summit technology Corp., Parlin, N.J.; DURIMIDE® 100, commercially available from FUJIFILM Electronic Materials U.S.A., Inc.

More specifically, polyamic acid or esters of polyamic acid examples that can be selected for the formation of a polyimide are prepared by the reaction of a dianhydride and a diamine. Suitable dianhydrides selected include aromatic dianhydrides and aromatic tetracarboxylic acid dianhydrides such as, for example, 9,9-bis(trifluoromethyl)xanthene-2,3,6,7-tetracarboxylic acid dianhydride, 2,2-bis(3,4-dicarboxyphenyl)hexafluoropropane dianhydride, 2,2-bis((3,4-dicarboxyphenoxy)phenyl)hexafluoropropane dianhydride, 4,4'-bis(3,4-dicarboxy-2,5,6-trifluorophenoxy)octafluorobiphenyl dianhydride, 3,3',4,4'-tetracarboxybiphenyl dianhydride, 3,3',4,4'-tetracarboxybenzophenone dianhydride, di-(4-(3,4-dicarboxyphenoxy)phenyl)ether dianhydride, di-(4-(3,4-dicarboxyphenoxy)phenyl)sulfide dianhydride, di-(3,4-dicarboxyphenyl)methane dianhydride, di-(3,4-dicarboxyphenyl)ether dianhydride, 1,2,4,5-tetracarboxybenzene dianhydride, 1,2,4-tricarboxybenzene dianhydride, butanetetracarboxylic dianhydride, cyclopentanetetracarboxylic dianhydride, pyromellitic dianhydride, 1,2,3,4-benzenetetracarboxylic dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 3,4,9,10-perylenetetracarboxylic dianhydride, 2,3,6,7-anthracene tetracarboxylic dianhydride, 1,2,7,8-phenanthrenetetracarboxylic dianhydride, 3,3',4,4'-biphenyltetracarboxylic dianhydride, 2,2',3,3'-biphenyltetracarboxylic dianhydride, 3,3',4-4'-benzophenonetetracarboxylic dianhydride, 2,2',3,3'-benzophenonetetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl)ether dianhydride, bis(2,3-dicarboxyphenyl)ether dianhydride, bis(3,4-dicarboxyphenyl)sulfone dianhydride, bis(2,3-dicarboxyphenyl)sulfone 2,2-bis(3,4-dicarboxyphenyl)-1,1,1,3,3,3-hexafluoropropane dianhydride, 2,2-bis(3,4-dicarboxyphenyl)-1,1,1,3,3,3-hexachloropropane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)methane dianhydride, 4,4'-(p-phenylenedioxy)diphthalic dianhydride, 4,4'-(m-phenylenedioxy)diphthalic dianhydride, 4,4'-diphenylsulfidedioxybis(4-phthalic acid)

dianhydride, 4,4'-diphenylsulfonedioxybis(4-phthalic acid) dianhydride, methylenebis(4-phenyleneoxy-4-phthalic acid) dianhydride, ethylidenebis(4-phenyleneoxy-4-phthalic acid) dianhydride, isopropylidenebis(4-phenyleneoxy-4-phthalic acid)dianhydride, hexafluoroisopropylidenebis(4-phenyleneoxy-4-phthalic acid)dianhydride, and the like.

Exemplary diamines selected suitable for use in the preparation of the polyamic acid include 4,4'-bis-(m-aminophenoxy)-biphenyl, 4,4'-bis-(m-aminophenoxy)-diphenyl sulfide, 4,4'-bis-(m-aminophenoxy)-diphenyl sulfone, 4,4'-bis-(p-aminophenoxy)-benzophenone, 4,4'-bis-(p-aminophenoxy)-diphenyl sulfide, 4,4'-bis-(p-aminophenoxy)-diphenyl sulfone, 4,4'-diamino-azobenzene, 4,4'-diaminobiphenyl, 4,4'-diaminodiphenylsulfone, 4,4'-diamino-p-terphenyl, 1,3-bis-(gamma-aminopropyl)-tetramethyl-disiloxane, 1,6-diaminohexane, 4,4'-diaminodiphenylmethane, 3,3'-diaminodiphenylmethane, 1,3-diaminobenzene, 4,4'-diaminodiphenyl ether, 2,4'-diaminodiphenylether, 3,3'-diaminodiphenylether, 3,4'-diaminodiphenylether, 1,4-diaminobenzene, 4,4'-diamino-2,2',3,3',5,5',6,6'-octafluoro-biphenyl, 4,4'-diamino-2,2',3,3',5,5',6,6'-octafluorodiphenyl ether, bis[4-(3-aminophenoxy)-phenyl]sulfide, bis[4-(3-aminophenoxy)phenyl]sulfone, bis[4-(3-aminophenoxy)phenyl]ketone, 4,4'-bis(3-aminophenoxy)biphenyl, 2,2-bis[4-(3-aminophenoxy)phenyl]-propane, 2,2-bis[4-(3-aminophenoxy)phenyl]-1,1,1,3,3,3-hexafluoropropane, 4,4'-diaminodiphenyl sulfide, 4,4'-diaminodiphenyl ether, 4,4'-diaminodiphenyl sulfone, 4,4'-diaminodiphenylmethane, 1,1-di(p-aminophenyl)ethane, 2,2-di(p-aminophenyl)propane, and 2,2-di(p-aminophenyl)-1,1,1,3,3,3-hexafluoropropane, and the like, and mixtures thereof.

The dianhydrides and diamines are, for example, selected in a weight ratio of from about 20:80 to about 80:20, and more specifically, in an about 50:50 weight ratio. The above aromatic dianhydride like aromatic tetracarboxylic acid dianhydrides, and diamines like aromatic diamines are used singly or as a mixture, respectively.

Yet more specifically, examples of polyamic acids utilized in effective amounts, such as from about 90 to about 99.99 weight percent, from about 95 to about 99 weight percent, or from about 98 to about 99.95 weight percent of the solids, include a polyamic acid of pyromellitic dianhydride/4,4'-oxydianiline, commercially available from Industrial Summit technology Corp., Parlin, N.J. with the trade name of Pyre-M.L. RC5019 or RC5083, and a polyamic acid of biphenyl tetracarboxylic dianhydride/phenylenediamine, commercially available as U-VARNISH A and S (about 20 weight percent in NMP), both available from UBE America Inc., New York, N.Y., or available from Kaneka Corp., Tex., and a polyamic acid of biphenyl tetracarboxylic dianhydride/4,4'-diaminobenzene available from Kaneka Corporation.

Polyimide examples selected for the disclosed fuser member compositions are, for example, represented by at least one of the following formulas/structures, and mixtures thereof

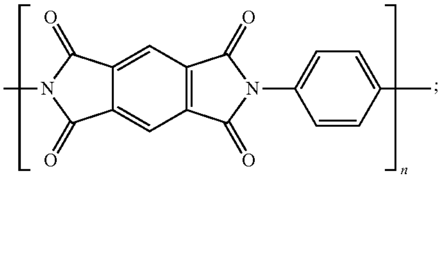
;

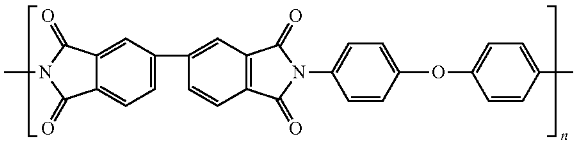

and

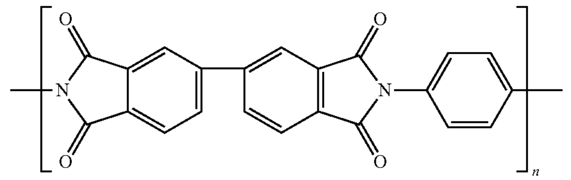

where n represents the number of repeating segments of, for example, from about 5 to about 3,000, from about 50 to about 2,000, from about 50 to about 1,500, from about 200 to about 1,200, from about 1,000 to about 2,000, or from about 1,200 to about 1,800.

Neutralized Amine Alcohol Phosphates

Neutralized amine alcohol phosphate examples, which phosphates are obtainable from Stepan Company, selected for the disclosed fuser member mixtures, are represented by the following formula/structure

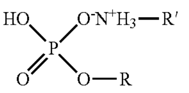

wherein R and R' represent a hydrocarbon, inclusive of linear, branched, cyclic, saturated and unsaturated hydrocarbons, such as alkyl and alkenyl, each independently with, for example, from about 1 to about 25 carbon atoms, about 6 to about 24 carbon atoms, from about 4 to about 18 carbon atoms, from about 10 to about 18 carbon atoms, from about 8 to about 16 carbon atoms, from about 8 to about 12 carbon atoms, or from about 8 to about 10 carbon atoms.

Examples of the neutralized amine alcohol phosphate hydrocarbon substituents are hexyl, heptyl, octyl, nonyl, decyl, undecyl, dodecyl, icosyl, cyclohexyl, hexenyl, heptenyl, octenyl, nonenyl, decenyl, undecenyl, dodecenyl, icosenyl, the corresponding alkenyls, and the like.

Specific examples of the neutralized amine alcohol phosphates are represented by at least one of

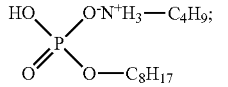

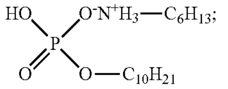

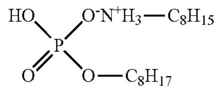

and

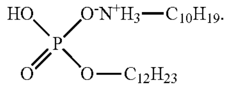

Various amounts of the neutralized amine alcohol phosphate can be selected for the fuser member composition, such as for example, from about 0.01 to about 10 weight percent (weight percent of the solids throughout), from about 0.1 to about 0.5 weight percent, from about 0.01 to about 5 weight percent, from about 0.01 to about 2 weight percent, from about 0.01 to about 0.5 weight percent, from about 0.02 to about 0.05 weight percent, from about 0.03 to about 0.3 weight percent, from about 0.03 to about 0.1 weight percent, from about 0.03 to about 0.5 weight percent, from about 0.03 to about 0.05 weight percent, from about 0.01 to about 0.05 weight percent, from about 0.02 to about 1 weight percent, from about 0.05 to about 1 weight percent, from about 0.01 to about 1 weight percent, or from about 0.1 weight percent, or less than or equal to about 0.1 weight percent with the amount of the polyimide, neutralized amine alcohol, and optional components, when present, being equal to about 100 percent. In embodiments, the fuser member composition of the polyimide polymer and the neutralized amine alcohol phosphate are present in a weight ratio of about 95/5, about 98/2, about 99/1, about 99.9/0.5, about 99.9/0.1, and about 99.95/0.05.

One specific disclosed fuser member comprises a mixture of a polyimide of biphenyl tetracarboxylic dianhydride/phenylenediamine or a polyimide prepared from the polyamic acid of biphenyl tetracarboxylic dianhydride/4,4'-diaminobenzene, and the disclosed neutralized amine alcohol phosphate, prepared in a solvent illustrated herein, about 16 to about 20 percent by weight of solids, and where the disclosed polyimide neutralized amine alcohol phosphate weight ratio is, for example, 99.9/0.1.

The disclosed polyimide/neutralized amine alcohol phosphate composition possesses, for example, a Young's modulus of from about 4,000 to about 10,000 Mega Pascals (MPa), from about 5,000 to about 10,000 MPa, from about 7,500 to about 8,500 MPA, and more specifically, about 8,400 MPa; and an onset decomposition temperature of from about 400° C. to about 650° C., from about 500° C. to about 640° C., and from about 600° C. to about 630° C.

Neutralized amine alcohol phosphates mean those phosphates as illustrated herein, and with a pH that minimizes or avoids the degradation of substrates selected for the preparation of fuser members, such as fuser belts, and which substrates are substantially free of degradation and discoloration. Thus, for example, the disclosed neutralized amine alcohol phosphates pH as determined by a pH meter is, for example, from about 4 to about 6.5, from about 4.5 to about 6.5, from about 4.5 to about 6.2, from about 5 to about 6.3, from about 5.5 to about 6.3, from about 5 to about 6.1, and more specifically, about 6.3, as compared to known alcohol phosphates that are more acidic with a pH of about 3.

The neutralized amine alcohol phosphates, which can function as a release agent or additive, are compatible with the solution coating of the polyimide and the neutralized amine alcohol phosphate (clear in color when mixed), and the resulting polyimide also possesses no apparent phase separation. Additionally, the resulting polyimide/neutralized amine alcohol phosphate composition, after final curing, self-releases from a metal coating substrate like stainless steel, polymer substrates, and diamond like carbon-coated metal substrates resulting in a smooth, no or minimum protrusions, polyimide/neutralized amine alcohol phosphate fuser member film.

Fillers

Additives and conductive or non-conductive fillers, in various amounts like, for example, from about 1 to about 40 weight percent, from 2 to about 25 weight percent, or from 3 to about 15 weight percent of the solids may be present in the polyimide and amine alcohol phosphate layer mixture of the disclosed fuser member coating composition including, for example, inorganic particles. Examples of selected fillers are aluminum nitride, boron nitride, aluminum oxide, graphite, graphene, copper flake, nano diamond, carbon black, carbon nanotube, metal oxides, doped metal oxide, metal flake, and mixtures thereof.

Functional Intermediate Layers

Examples of materials selected for the functional intermediate layers, or layer (also referred to as cushioning layer or intermediate layer) situated in contact with the coating mixture of the polyimide and neutralized amine alcohol phosphate mixture, and that can provide elasticity to the fuser member and the materials in the layer or layers, and which materials can be mixed with inorganic particles, such as for example, SiC or $Al_2O_3$, include fluorosilicones, silicone rubbers, such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both obtainable from Dow Corning; 106 RTV Silicone Rubber and 90 RTV Silicone Rubber, both obtainable from General Electric; JCR6115CLEAR HTV and SE4705U HTV silicone rubbers obtainable from Dow Corning; Toray Silicones; commercially available LSR rubbers obtainable from Dow Corning as Q3-6395, Q3-6396; SILASTIC® 590 LSR, SILASTIC® 591 LSR, SILASTIC® 595 LSR, SILASTIC® 596 LSR, and SILASTIC® 598 LSR; and siloxanes, such as polydimethylsiloxanes; fluorosilicones like Silicone Rubber 552, available from Sampson Coatings, Richmond, Va.; and liquid silicone rubbers such as vinyl crosslinked heat curable rubbers or silanol room temperature crosslinked materials.

Further materials suitable for use in the functional intermediate layer or layers include fluoroelastomers. Fluoroelastomers are from the class of 1) copolymers of two of vinylidenefluoride, hexafluoropropylene, and tetrafluoroethylene; 2) terpolymers of vinylidenefluoride, hexafluoropropylene, and tetrafluoroethylene; and 3) tetrapolymers of vinylidenefluoride, hexafluoropropylene, tetrafluoroethylene, and a cure site monomer. These fluoroelastomers are known and commercially available under various designations such as VITON A®, VITON B®, VITON E®, VITON E 60C®, VITON E430®, VITON 910®, VITON GH®; VITON GF®; and VITON ETP®. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers that can be selected include FLUOREL 2170®, FLUOREL 2174®, FLUOREL 2176®, FLUOREL 2177® and FLUOREL LVS 76®, FLUOREL® being a registered trademark of 3M Company. Additional commercially available selected fluoro materials include AFLAS™ a poly(propylene-tetrafluoroethylene), and FLUOREL II® (LII900) a poly(propylene-tetrafluoroethylenevinylidenefluoride), both available from 3M Company, as well as the Tecnoflons identified as FOR-60KIR®, FOR-LHF®, NM® FOR-THF®, FOR-TFS®, TH®, NH®, P757®, TNS®, T439®, PL958®, BR9151® and TN505®, available from Ausimont Inc.

The fluoroelastomers VITON GH® and VITON GF® have relatively low amounts of vinylidenefluoride. For example, the VITON GF® and VITON GH® have about 35 weight percent of vinylidenefluoride, about 34 weight percent of hexafluoropropylene, and about 29 weight percent of tetrafluoroethylene with about 2 weight percent cure site monomer.

The thickness of a functional intermediate layer or layers is, for example, from about 30 to about 1,000 microns, from about 10 to about 800 microns, from about 150 to about 500 microns, and from about 50 to about 60 microns.

Optional Polymers

The disclosed polyimide/neutralized amine alcohol phosphate fuser member composition can optionally further include a polysiloxane polymer to enhance or further smooth the composition when it is applied as a coating. The concentration of the polysiloxane copolymer is, for example, equal to or less than about 1 weight percent or equal to or less than about 0.2 weight percent, and more specifically, from about 0.1 to about 1 weight percent based on the total weight of the fuser member. The optional polysiloxane polymers include, for example, a polyester modified polydimethylsiloxane, commercially available from BYK Chemical, with the trade name of BYK® 310 (about 25 weight percent in xylene) and BYK® 370 (about 25 weight percent in xylene/alkylbenzenes/cyclohexanone/monophenylglycol=75/11/7/7); a polyether modified polydimethylsiloxane, commercially available from BYK Chemical, with the trade name of BYK® 330 (about 51 weight percent in methoxypropylacetate) and BYK® 344 (about 52.3 weight percent in xylene/isobutanol=80/20), BYK®-SILCLEAN 3710 and 3720 (about 25 weight percent in methoxypropanol); a polyacrylate modified polydimethylsiloxane, commercially available from BYK Chemical, with the trade name of BYK®-SILCLEAN 3700 (about 25 weight percent in methoxypropylacetate); or a polyester polyether modified polydimethylsiloxane, commercially available from BYK Chemical, with the trade name of BYK® 375 (about 25 weight percent in di-propylene glycol monomethyl ether). The polyimide/neutralized amine alcohol phosphate/polysiloxane polymer is present in, for example, a weight ratio of about 99.9/0.09/0.01 to about 95/4/1.

Optional Release Layer

Examples of the selected fuser member optional top overcoating release layer include fluoropolymers, such as fluorine-containing polymers, comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and crosslinked fluoroelastomers. Examples of fluoropolymer include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF) and hexafluoropropylene (HFP); and tetrapolymers of tetrafluoroethylene (TFE), vinylidene fluoride (VF2), and hexafluoropropylene (HFP), and mixtures thereof. The fluoropolymers provide chemical and thermal stability and have a low surface energy, and in the form of particles have a melting temperature of, for example, from about 255° C. to about 360° C. or from about 280° C. to about 330° C. These particles are melted to form the release layer.

The thickness of the outer surface layer or release layer can be, for example, from about 10 to about 100 microns, from about 20 to about 80 microns, or from about 40 to about 60 microns.

Fuser Member Preparation

The disclosed fuser member can be prepared as illustrated herein, such as by the flow coating of the polyimide and the neutralized amine alcohol phosphate composition on a supporting substrate. Thus, the polyimide/neutralized amine alcohol phosphate composition, and optional components that may be present, can be flow coated on a seamless or welded stainless steel cylinder, a glass cylinder or an electroformed seamless nickel cylinder at the desired product circumference. The polyimide/neutralized amine alcohol phosphate belt is partially cured, or pre-cured, and then fully cured as illustrated herein.

The disclosed fuser member composition can also be coated on a substrate by liquid spray coating, dip coating, wire wound rod coating, fluidized bed coating, powder coating, electrostatic spraying, sonic spraying, blade coating, molding, laminating, and the like.

The polyimide (or other polymer throughout) and neutralized amine alcohol phosphate coating composition can include a solvent. Examples of the solvent selected to form and apply the coating composition include toluene, hexane, cyclohexane, heptane, tetrahydrofuran, methyl ethyl ketone, methyl isobutyl ketone, N,N'-dimethylformamide, N,N'-dimethylacetamide, N-methylpyrrolidone (NMP), methylene chloride, and the like, and mixtures thereof, where the solvent is selected, for example, in an amount of from about 70 to about 95 weight percent, and from 80 to about 90 weight percent based on the amounts of component in the coating mixture, and more specially, where there results from about 15 to about 17, such as 16.5 weight percent solids.

Specific embodiments will now be described in detail. These examples are intended to be illustrative, and not limited to the materials, conditions, or process parameters set forth in these embodiments. All parts are percentages by solid weight unless otherwise indicated.

EXAMPLE I

A composition comprising in a weight ratio of 99.9 to 0.1 a polyimide prepared from the polyamic acid of biphenyl tetracarboxylic dianhydride/4,4'-diaminobenzene, which polyamic acid was obtained from Kaneka Corporation, and the neutralized amine alcohol phosphate ZELEC® AN, pH of 6.3 as determined by a pH meter, of the following formula/structure

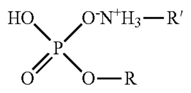

where R is an alkyl having from about 8 to about 10 carbon atoms; and R' is an alkyl having from about 4 to about 18 carbon atoms, and obtained from Stepan Company, was prepared in N-methylpyrrolidone (NMP) at about 16.5 weight percent solids. The polyamic acid, obtained from Kaneka Corporation, converts after pre-curing and then final curing into the polyimide of biphenyl tetracarboxylic dianhydride/4,4'-diaminobenzene.

The above resulting composition liquid was coated on a stainless steel rigid cylindrical mandrel substrate, and then subsequently pre-cured at about 220° C. for about 75 minutes, followed by a final curing at a temperature of about 325° C. for about 60 minutes.

The obtained polyimide/neutralized alcohol phosphate fuser belt self released from the stainless steel substrate in about 5 seconds, and a 60 micron thick smooth polyimide/neutralized amine alcohol phosphate fuser member mixture film was obtained, and which fuser member was incorporated into a xerographic machine for the fusing of xerographic toner developed images as disclosed herein.

The above stainless steel substrate, after self release of the polyimide/reduced acidic neutralized amine alcohol phosphate film, was free of degradation and discoloration for twenty (20) separate repeated fuser belt film preparations.

EXAMPLE II

There is prepared a number of fuser members by repeating the process of Example I, except that the neutralized amine alcohol phosphate is replaced with the neutralized amine alcohol phosphates of the following formulas/structures

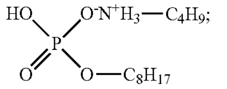

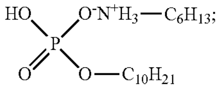

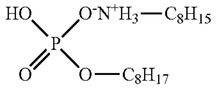

or

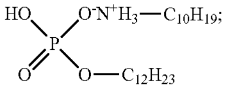

and where it is believed that substantially similar or the same results are achievable.

COMPARATIVE EXAMPLE 1

A coating composition was prepared by repeating the process of Example I with the exception that no neutralized amine alcohol phosphate was included in the composition. The resulting polyimide fuser belt did not release from the coating substrate. After being immersed in water for an extended time period of 3 months, the above Comparative Example 1 fuser member film obtained eventually self-released from the substrate.

COMPARATIVE EXAMPLE 2

A coating composition was prepared by repeating the process of Example I with the exception that in place of the neutralized amine alcohol phosphate, pH of 6.3, there was selected the more acidic non-neutralized alcohol phosphate ZELEC® UN a mixture of $C_8H_{17}$—O—P(═O)(OH)$_2$ and $C_{10}H_{21}$—O—P(═O)(OH)$_2$ obtained from Stepan Company, pH 3, and in a weight percent ratio of the polyimide/alcohol phosphate of 99.95/0.05.

Measurements

The known Young's Modulus property is used to determine the stiffness of materials, and more specifically, the Young's Modulus measures the elastic properties of a solid undergoing tension or compression in only one direction that after being stretched or compressed lengthwise returns to its original length. Young's Modulus is a measure of the ability of the intermediate transfer members to withstand changes in length when under lengthwise tension or compression.

The Young's Modulus was measured by following the known ASTM D882-97 process. A sample (0.5 inch×12 inch) of the fuser members or belts prepared above were placed in an Instron Tensile Tester measurement apparatus, and then the samples were elongated at a constant pull rate until breaking. During this time, there was recorded the resulting load versus the sample elongation. The Young's Modulus was calculated by taking any point tangential to the initial linear portion of the recorded curve results and dividing the tensile stress by the corresponding strain. The tensile stress was calculated by the load divided by the average cross-sectional area of each of the tests.

The above prepared fuser belts had the following Table 1 characteristics, where the onset decomposition temperature in degrees Centigrade was determined by TGA.

TABLE 1

| Example Number | Young's Modulus (MPa) | Onset Decomposition Temperature (° C.) |
|---|---|---|
| The Polyimide Belt Substrate of Comparative Example 1 | 6,500 | 620 |
| The Polyimide/Alcohol Phosphate Substrate Member, 99.95/0.05, of Comparative Example 2 | 5,800 | 626 |
| The Polyimide/Neutralized Amine Alcohol Phosphate, 99.9/0.1, of Example I | 8,380 | 629 |

All three Examples showed comparable onset decomposition temperatures indicating that incorporation of the internal release agents (alcohol phosphate in Comparative Example 2 or neutralized amine alcohol phosphate in Example I) did not negatively affect the thermal stability of the fuser member.

The 8,380 Young's Modulus of the Example I member was substantially higher that the Young's Modulus of the Comparative Example 1 and the Comparative Example 2 fuser members, thereby significantly extending the Example 1 member lifetime.

Further, the intermediate transfer member's stainless steel substrate of Comparative Example 2, when an acidic alcohol phosphate was present in the fuser member, was discolored to a brownish color and degraded versus the non-degraded and clear color, no discoloration, for the stainless steel substrate of Example I when a less acidic neutralized amine alcohol phosphate was present in the fuser member.

Additionally, the disclosed neutralized amine alcohol phosphate containing fuser member of Example I possessed excellent release characteristics versus the Comparative Example 1 fuser member in that the Example I member readily self-released from a stainless steel substrate in 5 seconds, whereas the Comparative Example 1 thermoset polyimide containing fuser member did not release from the stainless steel substrate, but rather adhered to this substrate, and only after being immersed in water for 3 months did release occur.

After preparing twenty (20) fuser members by continuously repeating the processes of Example I and Comparative Example 2, the mixture containing the acidic non-neutralized alcohol phosphate ZELEC® UN released from the stainless steel substrate, but with substrate defects caused by the irreversible contamination of the stainless steel substrate by the acid amounts present in the coating composition, and the release of the fuser member mixture was inconsistent with partial release or no release. For the Example I member, there were enabled twenty (20) consistent releases of the fuser film polyimide/neutralized amine alcohol phosphate mixture from the stainless steel substrate, and where the substrate in each instance was not degraded or discolored, and each release of the fuser member was consistent.

The above prepared neutralized amine alcohol phosphate containing Example I fuser member and those neutralized amine alcohol phosphate containing fuser member mixtures disclosed herein can be selected as a fuser device or fuser belt in a xerographic imaging process, or the polyimide/neutralized amine alcohol phosphate mixture can be coated on a supporting substrate such as a polymer or other suitable known substrates.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. A fuser member comprising a substrate layer comprising a mixture of a polyimide and a neutralized amine alcohol phosphate and wherein said polyimide and said neutralized amine alcohol phosphate mixture further comprises a polysiloxane polymer selected from the group consisting of a polyester modified polydimethylsiloxane, a polyether modified polydimethylsiloxane, a polyacrylate modified polydimethylsiloxane, and a polyester polyether modified polydimethylsiloxane.

2. A fuser member in accordance with claim 1 wherein said neutralized amine alcohol phosphate is of the following formula/structure

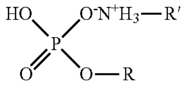

wherein R and R' are each a hydrocarbon group.

3. A fuser member in accordance with claim 2 wherein each R and R' are selected from the group consisting of linear, branched, cyclic, saturated, and unsaturated hydrocarbons.

4. A fuser member in accordance with claim 2 wherein each of said R and R' hydrocarbon is independently alkenyl with from about 8 to about 12 carbon atoms.

5. A fuser member in accordance with claim 2 wherein each of said R and R' hydrocarbon is independently an alkyl.

6. A fuser member in accordance with claim 5 wherein said alkyl contains from about 1 to about 25 carbon atoms.

7. A fuser member in accordance with claim 5 wherein said alkyl contains from about 8 to about 16 carbon atoms.

8. A fuser member in accordance with claim 5 wherein said R and R' are alkyl of methyl, ethyl, propyl, butyl, pentyl, hexyl, heptyl, octyl, nonyl, or decyl, and isomers thereof.

9. A fuser member in accordance with claim 2 wherein said neutralized amine alcohol phosphate is represented by at least one of the following formulas/structures

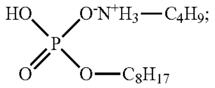

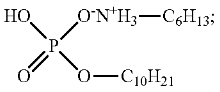

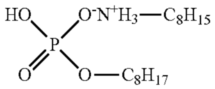

and

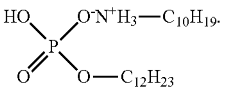

10. A fuser member in accordance with claim 2 where said neutralized amine alcohol phosphate is of a pH of from about 4 to about 6.5.

11. A fuser member in accordance with claim 2 wherein said neutralized amine alcohol phosphate is of a pH of from about 5 to about 6.3.

12. A fuser member in accordance with claim 2 wherein said neutralized amine alcohol phosphate is present in an amount of from about 0.01 to about 10 weight percent.

13. A fuser member in accordance with claim 2 wherein said neutralized amine alcohol phosphate is present in an amount of from about 0.05 to about 1 weight percent.

14. A fuser member in accordance with claim 2 wherein said polyimide is represented by at least one of the following formulas/structures

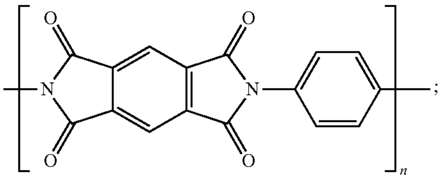

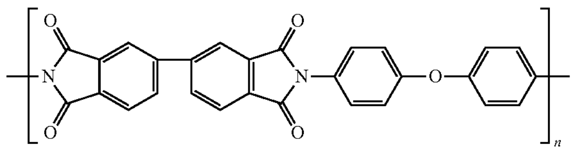

and

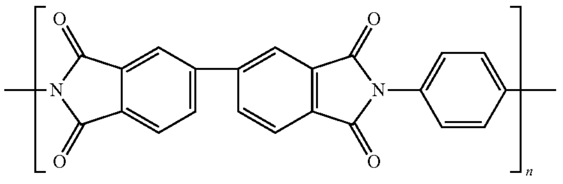

wherein n represents the number of repeating groups.

15. A xerographic fuser member comprising a mixture of a polysiloxane polymer selected from the group consisting of a polyester modified polydimethylsiloxane, a polyether modified polydimethylsiloxane, a polyacrylate modified polydimethylsiloxane, and a polyester polyether modified polydimethylsiloxane; a polyimide, and a neutralized amine alcohol phosphate with a pH of from about 4 to about 6.5, and of the following formula/structure

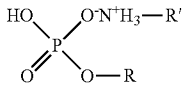

wherein R and R' are each independently an alkyl group with from about 1 to about 25 carbon atoms and which member possesses a Young's Modulus of from about 5,000 to about 10,000 MPa.

16. A fuser member in accordance with claim 2 wherein the polyimide and the neutralized amine alcohol phosphate are present in a weight ratio of about 95/5.0, about 98/2.0, about 99/1.0, about 99.9/0.5, about 99.9/0.1 and about 99.95/0.05.

17. A fuser member in accordance with claim 2 further including fillers selected from the group consisting of aluminum nitride, boron nitride, aluminum oxide, graphite, graphene, copper flake, nano diamond, carbon black, carbon nanotube, metal oxides, doped metal oxide, metal flake, and mixtures thereof.

18. A xerographic fuser belt consisting of an optional supporting substrate, and a composition of a mixture of a polyimide and a neutralized amine alcohol phosphate of the following formula/structure

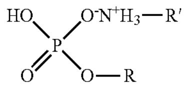

wherein R and R' are each independently an alkyl group or an alkenyl group, and wherein said neutralized amine alcohol phosphate has a pH of from about 4 to about 6.5.

19. A xerographic fuser belt in accordance with claim 18 wherein said polyimide is represented by at least one of the following formulas/structures

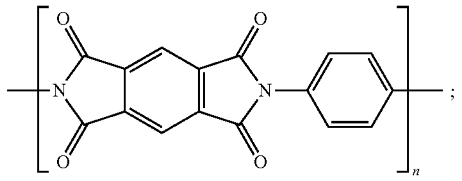

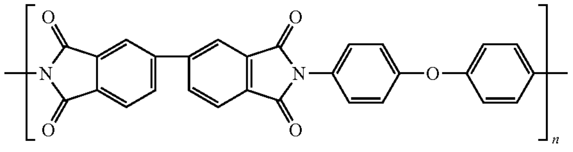

and

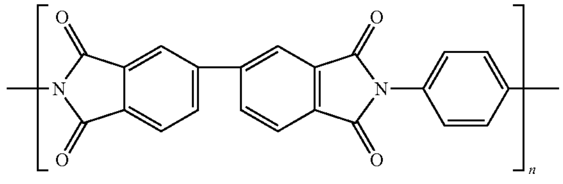

wherein n represents the number of repeating groups of from about 50 to about 2,000, and wherein said neutralized amine alcohol phosphate present in an amount of from about 0.01 to about 1 weight percent of the solids has a pH of from about 5.5 to about 6.3, and which neutralized amine alcohol phosphate is represented by at least one of the following formulas/structures

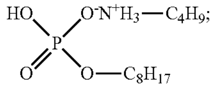

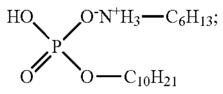

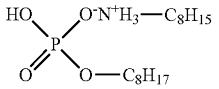

and

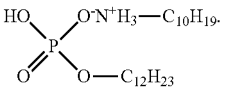

20. A fuser member in accordance with claim 15 wherein said neutralized amine alcohol phosphate is represented by at least one of the following formulas/structures

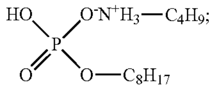
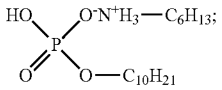
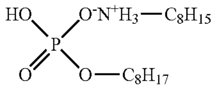
and
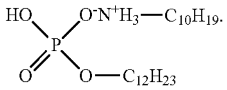
* * * * *